United States Patent
Yoneyama

Patent Number: 6,128,140
Date of Patent: Oct. 3, 2000

[54] ZOOM LENS SYSTEM

[75] Inventor: Shuji Yoneyama, Saitama, Japan

[73] Assignee: Asahi Kogaku Kogyo Kabushiki Kaisha, Tokyo, Japan

[21] Appl. No.: 09/332,977

[22] Filed: Jun. 15, 1999

[30] Foreign Application Priority Data

Jun. 16, 1998 [JP] Japan .................................. 10-168917

[51] Int. Cl.[7] ................................................ G02B 15/14
[52] U.S. Cl. .......................... 359/687; 359/684; 359/686
[58] Field of Search ..................................... 359/686, 687, 359/676, 683, 684, 685

[56] References Cited

U.S. PATENT DOCUMENTS

| | | | |
|---|---|---|---|
| 4,952,039 | 8/1990 | Ito | 350/428 |
| 5,528,423 | 6/1996 | Arimoto et al. | 359/687 |
| 5,699,198 | 12/1997 | Inadome et al. | 359/684 |
| 5,815,321 | 9/1998 | Shimo | 359/687 |

FOREIGN PATENT DOCUMENTS

| | | |
|---|---|---|
| 4149402 | 5/1992 | Japan . |
| 6-75167 | 3/1994 | Japan . |

Primary Examiner—Georgia Epps
Assistant Examiner—David N. Spector
Attorney, Agent, or Firm—Greenblum & Bernstein, P.L.C.

[57] ABSTRACT

A zoom lens system which includes a positive first lens group, a negative second lens group, a positive third lens group, and a positive fourth lens group. All of the lens groups move toward the object upon zooming from the short focal length extremity to the long focal length extremity. The positive third lens group includes at least a positive lens element and a negative lens element. The positive fourth lens group includes at least one negative lens element. When the object distance changes from infinity to a finite object distance, focusing is performed by moving the second lens group toward the object, and the following conditions are satisfied: (1) $-1.23 < m_{3\text{-}4W} < -1.0$, (2) $0.02 < d_{19}/fw < 0.30$, (3) $1.6 < n_{L13} < 1.76$; wherein $m_{3\text{-}4W}$: the resultant lateral magnification of the third and fourth lens groups which are considered to be one lens group at the short focal length extremity; $d_{19}$: the distance between the positive lens element and the negative lens element in the third lens group; fw: the focal length of the entire lens system at the short focal length extremity; and $n_{L13}$: the refractive index of the negative lens element closest to the image in the fourth lens group.

4 Claims, 11 Drawing Sheets

SPHERICAL ABERRATION
THE SINE CONDITION

SPHERICAL ABERRATION
CHROMATIC ABERRATION

LATERAL CHROMATIC ABERRATION

ASTIGMATISM

DISTORTION

ZOOM LENS SYSTEM

BACKGROUND OF THE INVENTION

1. Field of the Invention

The present invention relates to a four-lens-group zoom lens system suitable for use in a photographic lens for a still camera, or a video camera and the like.

2. Description of the Related Art

A three-lens-group (substantially a four-lens-group) zoom lens system is proposed in Japanese Unexamined Patent Publication No. Hei-4-149402. However, such a zoom lens system, having the half angle-of-view of about 37° at the short focal length extremity, cannot adequately meet the requirement of a wider angle-of-view than that of the above publication. Furthermore, since heavy lens elements on the side of an image are used for a focusing lens group, the load on the focusing lens mechanism is increased, which is disadvantageous for materializing automatic focusing. Japanese Unexamined Patent Publication No. Hei-6-75167 also teaches a four-lens-group zoom lens system, which is however insufficient from the viewpoint of a wider angle-of-view.

SUMMARY OF THE INVENTION

It is an object of the present invention to provide a zoom lens system having a zoom ratio of about 3.5 at a wide-angle side half angle-of-view of about 42°.

According to the present invention, there is provided a zoom lens system which includes a positive first lens group, a negative second lens group, a positive third lens group, and a positive fourth lens group, in this order from the object. All of the lens groups move toward the object upon zooming from the short focal length extremity to the long focal length extremity. The positive third lens group includes at least a positive lens element and a negative lens element, in this order from the object. The positive fourth lens group includes at least one negative lens element. When the object distance changes from infinity to a finite object distance, focusing is performed by moving the second lens group toward the object, and the zoom lens system satisfies the following conditions:

$$-1.23 < m_{3-4W} < -1.0 \tag{1}$$

$$0.02 < d_{19}/fw < 0.30 \tag{2}$$

$$1.6 < n_{L13} < 1.76 \tag{3}$$

wherein $m_{3-4W}$ designates the lateral magnification of the third and fourth lens groups which are considered to be one lens group at the short focal length extremity;

$d_{19}$ designates the distance between the positive lens element and the negative lens element in the third lens group;

fw designates the focal length of the entire lens system at the short focal length extremity; and $n_{L13}$ designates the refractive index of the negative lens element closest to the image in the fourth lens group.

Instead of the above condition (2), the following condition is more preferably satisfied:

$$0.04 < d_{19}/fw < 0.30 \tag{2'}$$

In addition to the above conditions, the following is a preferable and practical example of a lens arrangement according to the present invention:

The positive first lens group includes a cemented sub lens group having a negative lens element and a positive lens element, and a positive meniscus lens element having a convex surface on the object side, in this order from the object.

The negative second lens group includes a negative meniscus lens element having a convex surface on the object side, a cemented sub lens group having a positive lens element and a negative lens element, a positive lens element, and a negative lens element having a strongly powered concave surface on the object side, in this order from the object.

The positive third lens group includes a bi-convex positive lens element, a positive lens element having a strongly powered convex surface on the object side, and a negative lens element, in this order from the object.

The positive fourth lens group includes a positive lens element, and a negative lens element having a strongly powered concave surface on the image side.

The present disclosure relates to subject matter contained in Japanese Patent Application No.10-168917 (filed on Jun. 16, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

As shown in FIGS. 1, 5, 9, 13 and 17, the four-lens-group zoom lens system includes a positive first lens group 10, a negative second lens group 20, a diaphragm S, a positive third lens group 30, and a positive fourth lens group 40, in this order from the object. When zooming is performed from the short focal-length extremity toward the long focal-length extremity, all of the lens groups move toward the object while mutually varying the distance between the lens groups. The diaphragm S moves integrally with the positive third lens group 30. Focusing is performed by moving the negative second lens group 20 toward the object when the object distance is varied from infinity to a finite distance.

Moreover, as can be seen in each embodiment in FIGS. 1, 5, 9, 13 and 17, the positive first lens group 10 includes a cemented sub lens group having a negative lens element L1 and a positive lens element L2, and a positive meniscus lens element L3 having a convex surface on the object side, in this order from the object. The negative second lens group 20 includes a negative meniscus lens element L4 having a convex surface on the object side, a cemented sub lens group having a positive lens element L5 and a negative lens element L6, a positive lens element L7, and a negative lens element L8 having a strongly powered concave surface on the object side, in this order from the object. The positive third lens group 30 includes a bi-convex positive lens element L9, a positive lens element L10 having a strongly powered convex surface on the object side, and a negative lens element L11, in this order from the object. The positive fourth lens group 40 includes a positive lens element L12 and a negative lens element L13 having a strongly powered concave surface on the image side. The entire lens system includes 13 lens elements. The above explained negative meniscus lens element L4, which has a convex surface on the object side and is positioned closest to the object in the second lens group 20, is a hybrid lens element having an aspheric surface layer R made from a compound resin material adhered thereto.

Condition (1) specifies the lateral magnification $m_{3-4W}$ (the suffix "W" indicates the wide angle extremity) for the third lens group 30 and the fourth lens group 40 which are considered to be one lens group (i.e., behind the third lens group 30 (including the third lens group L3)) at wide angle extremity. A lateral magnification $m_{3-4}$ (<0) of a lens group behind the third lens group 30 is the lowest (absolute value) at the wide angle extremity and becomes higher (absolute value) towards the telephoto extremity. When the lateral magnification $m_{3-4W}$ has a low value (absolute value) to the extent that $m_{3-4W}$ exceeds the upper limit of condition (1), a lateral magnification $m_{3-4}$ in the vicinity of the wide angle extremity becomes less than −1 (absolute value), and when zooming towards the telephoto extremity is being performed, a lateral magnification $m_{3-4}$ exceeds −1 and $m_{3-4}$ becomes larger than −1 (absolute value). On the other hand, the zooming traveling paths of the third lens group 30 and the fourth lens group 40 are determined so that field curvature of the meridional image plane is corrected not to be developed in the positive direction and the lens groups can be moved smoothly for zooming operation. However, in a focal length range wherein a lateral magnification $m_{3-4}$ is less than −1 (absolute value), since the change in the position of the image plane with respect to the traveling distance of the third lens group 30 (and a lens group behind the third lens group L3) along the optical axis is small, it is difficult to satisfactorily correct the above mentioned field curvature.

Another disadvantage when a lateral magnification exceeds the lower limit of condition (1) will be discussed. When zooming operation is performed, the second lens group 20 is moved towards the image side from the object side up to a focal length position, from the wide angle extremity, where a lateral magnification is about −1; and from there to the telephoto extremity, the second lens group 20 is moved from the image side towards the object side. In other words, the second lens group 20 makes a "U-turn" movement. However, in the case where zooming is performed by the second lens group 20, if infinity is made to a reference object distance, the second lens group 20 has to be advanced towards the object when focusing is performed to an object at a finite distance. If the second lens group 20 is arranged to make a "U-turn" movement, a mechanism for focusing and a mechanism for zooming have to be provided, so that the entire mechanism becomes complicated. By satisfying condition (1), the zooming traveling path for the second lens group 20 is determined so that the second lens group 20 does not make a "U-turn" movement. Consequently, zooming and focusing are controlled through a common mechanism whereby the entire mechanism can be made simple.

If the resultant lateral magnification becomes smaller to the extent that $m_{3-4W}$ exceeds the lower limit of the condition (1), aberrations that occur in the third lens group 30 and the fourth lens group 40 increase, which curves the meridional image plane in the positive direction.

Condition (2) specifies the distance $d_{19}$ between the positive lens element L10 and the negative lens element L11 in the third lens group 30. Since the third lens group 30 is provided with a diaphragm S in the vicinity of the object side, the third lens group L3 substantially works to correct spherical aberration.

If the distance $d_{19}$ is made shorter to the extent that d19/fw exceeds the lower limit of condition (2), since the incident-height of the axial rays striking the negative lens element L11, the rays of which emerge from the positive lens element L10, are to be converged, and are made incident on negative lens element L11, is increased, spherical aberration in the positive direction increases, and subsequently spherical aberration in the entire system is over-corrected, so that spherical aberration in the entire system occurs in the positive direction. Furthermore, if the lower limit of the condition (2) is maintained to be about 0.04

(condition (2')), the occurrence of spherical aberration in the positive direction on the object-side surface of the negative lens element L11 can more be reduced, which is advantageous to correct aberrations.

On the other hand, in order to prevent over-correction of spherical aberration, if the image-side surface of the positive lens element L10 is made to have a strong positive power so that spherical aberration in the negative direction occurs, spherical aberration in the negative direction due to the positive lens element L10 and spherical aberration in the positive direction due to the negative lens element L11 cancel each other out, so that the sensitivity of error becomes too much high, which causes difficulties in manufacturing the entire lens system while predetermined optical performance is maintained. In other words, spherical aberration would vary greatly due to even a slight amount of error in the distance $d_{19}$. Likewise, a large amount of coma would occur due to a slight amount of decentration error. If, in order to prevent such a problem, the positive lens element L10 and the negative lens element L11 are cemented to each other, the cost of cementing these lens elements L10 and L11 is incurred, which increases the overall cost of the zoom lens system.

If the distance $d_{19}$ is made longer to the extent that $d_{19}/fw$ exceeds the upper limit of condition (2), spherical aberration occurs in the negative direction; and the length of the entire lens system increases.

Condition (3) specifies the refractive index of the negative lens element L13 which is closest to the image in the fourth lens group 40. If the refractive index of the negative lens element L13 is made smaller to the extent that $n_{L13}$ exceeds the lower limit of condition (3), the negative power of the negative lens element L13 also decreases, and spherical aberration in the negative direction occurs with the result that spherical aberration cannot be corrected. Furthermore, the Petzval Sum increases, which curves the image plane in the negative direction.

If the refractive index of the negative lens element L13 is increased to the extent that $n_{L13}$ exceeds the upper limit of condition (3), the Petzval Sum decreases, which causes field curvature in the positive direction. Furthermore, even if an aspheric surface is designed to be formed on the negative lens element L13, such an aspheric surface will be disadvantageous for manufacturing, because it is difficult to obtain a glass material which is easy to mold and has a refractive index that satisfies condition (3). A plastic material which is easy to mold cannot attain a high refractive index which satisfies condition (3).

Specific numerical data of the embodiments will be described below via the tables and diagrams. In the diagrams of chromatic aberration represented by spherical aberrations, the solid lines and the two types of dotted lines respectively indicate spherical aberrations with respect to the d, g and C lines. Also, in the diagrams of lateral chromatic aberration, the solid lines and the two types of dotted lines respectively indicate magnifications with respect to the d, g and C lines. S designates the sagittal image plane, and M designates the meridional image plane. FNO designates the F-number, f designates the focal length, W designates the half angle-of-view, and $f_B$ designates the back focal distance. R designates the radius of curvature of each lens surface, D designates the lens thickness or distance, $N_d$ designates refractive index with respect to the d-line, and $\upsilon_d$ designates the Abbe number.

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10}+A12h^{12}\ldots;$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient;

A10 designates a tenth-order aspherical coefficient.

A12 designates a twelfth-order aspherical coefficient.

[First Embodiment]

Figure 1:
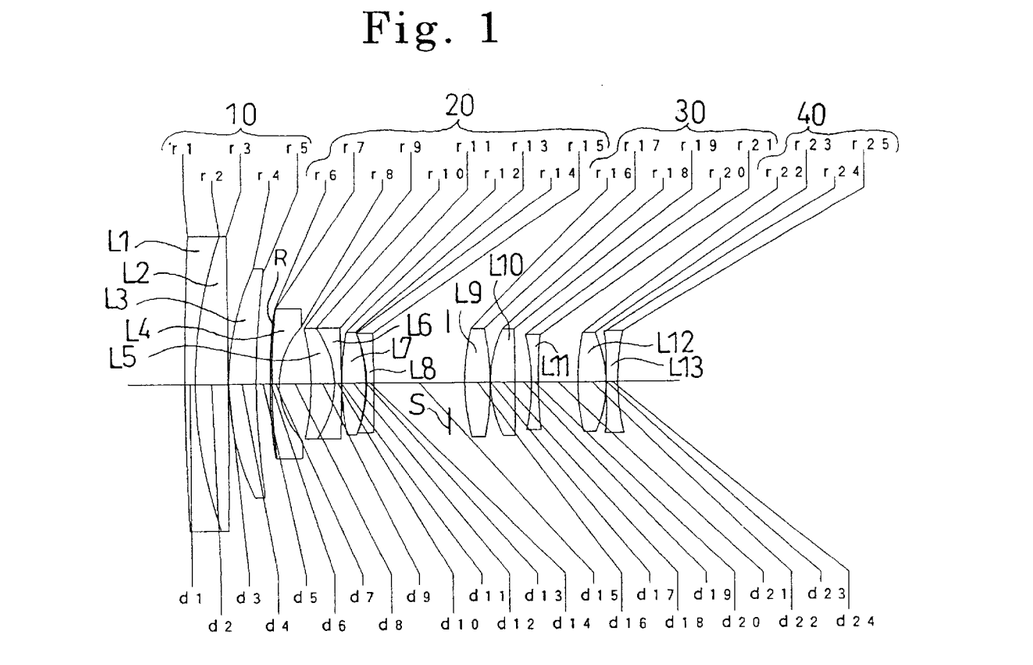
FIG. 1 is a lens arrangement of the first embodiment of a zoom lens system according to the present invention.
Figure 2A:
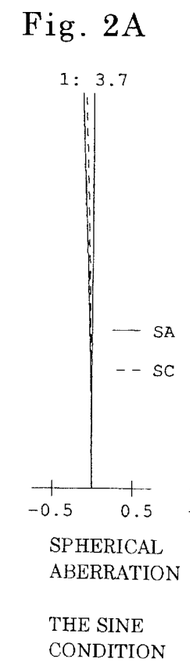
FIGS. 2A, 2B, 2C, 2D and 2E are aberration diagrams of the zoom lens system shown in FIG. 1 at the short focal-length extremity.
Figures 2B, 2C:
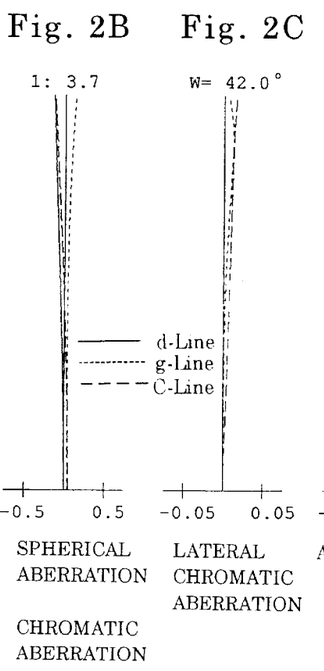
Figure 2D:
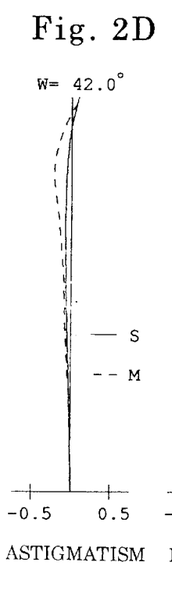
Figure 2E:
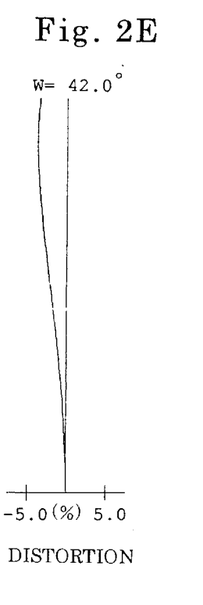
Figure 3A:
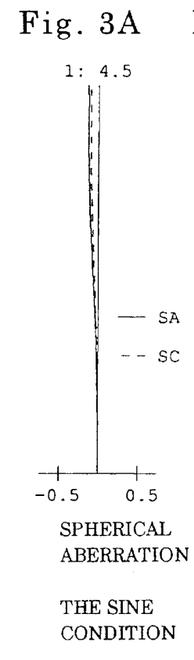
FIGS. 3A, 3B, 3C, 3D and 3E are aberration diagrams of the zoom lens system shown in FIG. 1 at an intermediate focal-length.
Figures 3B, 3C:
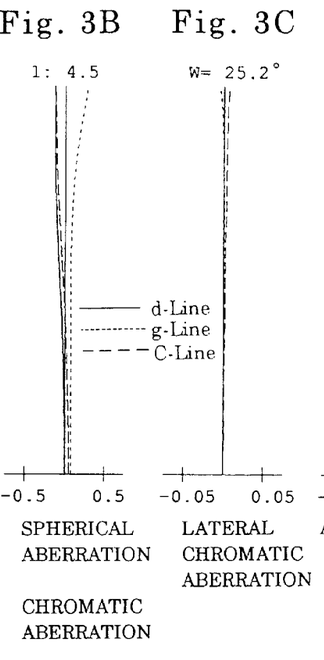
Figure 3D:
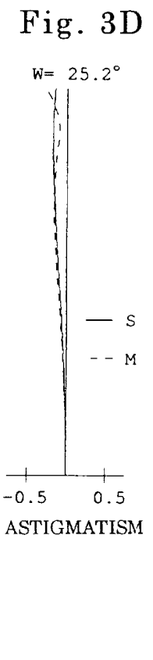
Figure 3E:
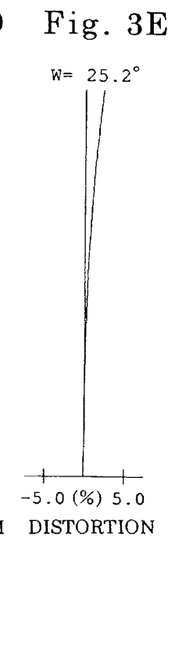
Figure 4A:
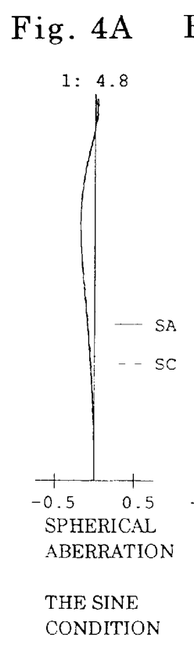
FIGS. 4A, 4B, 4C, 4D and 4E are aberration diagrams of the zoom lens system shown in FIG. 1 at the long focal-length extremity.
Figures 4B, 4C, 4D, 4E:
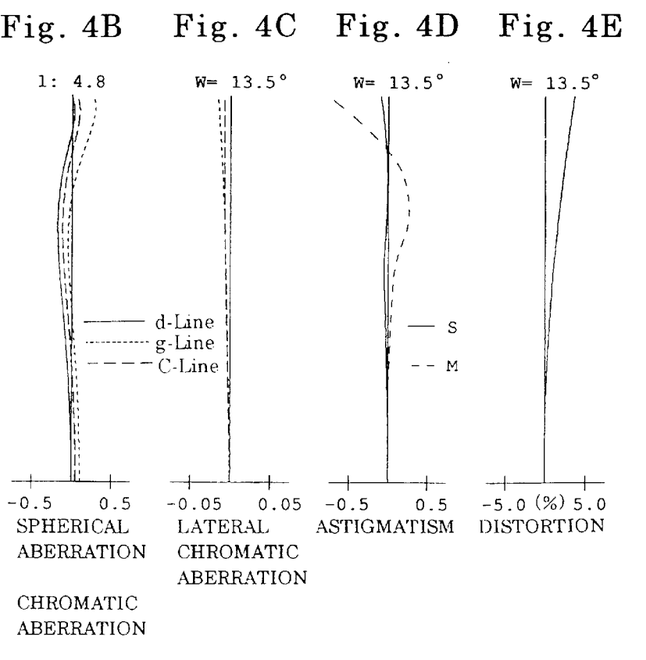

FIG. 1 is a lens arrangement of the first embodiment of a zoom lens system according to the present invention. FIGS. 2A through 2E, FIGS. 3A through 3E, and FIGS. 4A through 4E are aberration diagrams of the zoom lens system shown in FIG. 1 at the short focal-length extremity, an intermediate focal-length, and the long focal-length extremity, respectively. The numerical data thereof is shown in Table 1.

TABLE 1

$F_{NO} = 1:3.7–4.5–4.8$
$f = 24.89–45.02–86.80$ (zoom ratio:3.48)
$W = 42.0°–25.2°–13.5°$
$f_B = 38.50–55.18–70.33$

| Surface No. | R | D | $N_d$ | $\upsilon_d$ |
|---|---|---|---|---|
| 1 | 543.896 | 1.80 | 1.84666 | 23.8 |
| 2 | 80.101 | 5.74 | 1.77250 | 49.6 |
| 3 | -1799.643 | 0.10 | — | — |
| 4 | 47.517 | 4.80 | 1.77250 | 49.6 |
| 5 | 136.888 | 2.43–12.07–27.91 | — | — |
| 6 * | 182.407 | 0.30 | 1.52630 | 51.1 |
| 7 | 110.488 | 1.30 | 1.83481 | 42.7 |
| 8 | 14.387 | 5.66 | — | — |
| 9 | -39.735 | 4.09 | 1.51742 | 52.4 |
| 10 | -16.451 | 1.20 | 1.83481 | 42.7 |
| 11 | -293.944 | 0.11 | — | — |
| 12 | 52.860 | 4.23 | 1.84666 | 23.8 |
| 13 | -24.828 | 0.23 | — | — |
| 14 | -22.260 | 1.20 | 1.80400 | 46.6 |
| 15 | -276.363 | 14.86–6.44–1.00 | — | — |
| Diaphragm | — | 1.20 | — | — |
| 16 | 38.109 | 4.52 | 1.61800 | 63.4 |
| 17 | -47.897 | 0.10 | — | — |
| 18 | 21.740 | 4.40 | 1.48749 | 70.2 |
| 19 | -635.520 | 2.94 | — | — |
| 20 | -35.529 | 1.20 | 1.84666 | 23.8 |
| 21 | 94.270 | 7.10–3.64–2.46 | — | — |
| 22 | 43.110 | 5.00 | 1.48749 | 70.2 |
| 23 | -21.256 | 0.10 | — | — |
| 24 * | -1500.000 | 2.00 | 1.66910 | 55.4 |
| 25 | 40.922 | — | — | — |

* designates the aspherical surface which is symmetrical with respect to the optical axis.

Aspherical surface data (the aspherical surface coefficients not indicated are zero (0.00)):

No.6: $k=-1.0, A4=0.1804\times10^{-4}, A6=-0.3640\times10^{-7}, A8=0.9700\times10^{-10}$ No.24: $k=-1.0, A4=-0.4270\times10^{-4}, A6=-0.5980\times10^{-7}, A8=-0.4940\times10^{-9}$

[Second Embodiment]

Figure 5:
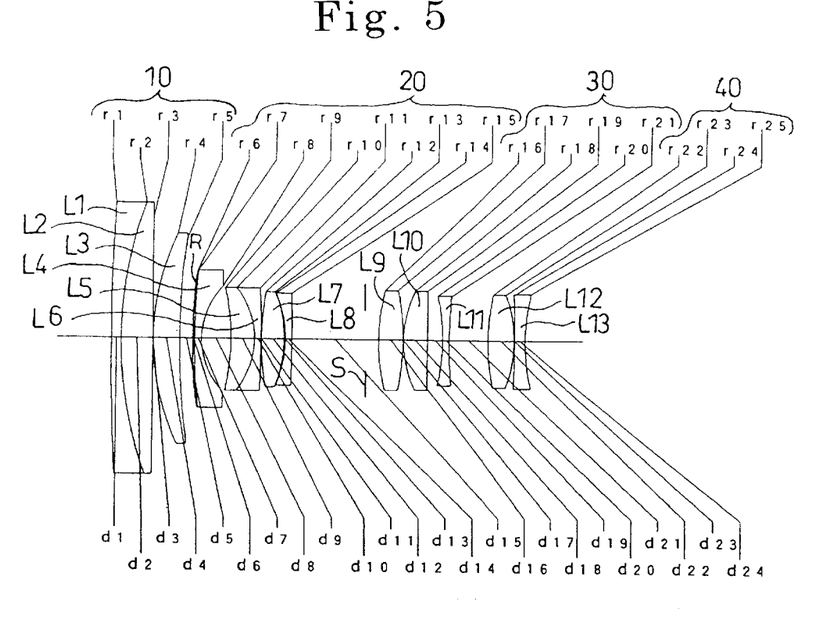
FIG. 5 is a lens arrangement of the second embodiment of a zoom lens system according to the present invention.
Figure 6A:
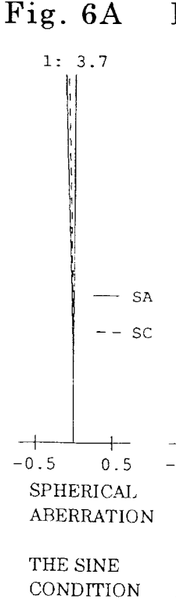
FIGS. 6A, 6B, 6C, 6D and 6E are aberration diagrams of the zoom lens system shown in FIG. 5 at the short focal-length extremity.
Figure 6B:
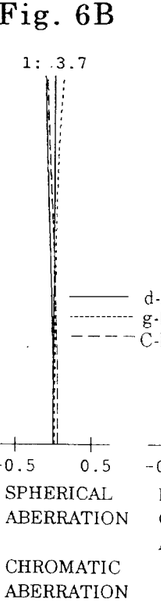
Figure 6C:
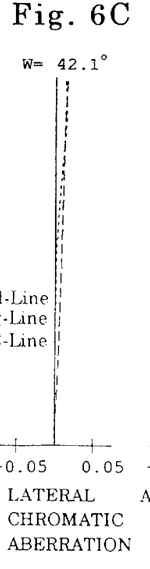
Figure 6D:
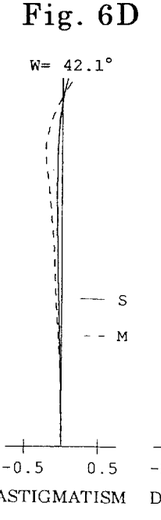
Figure 6E:
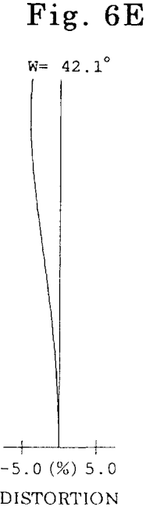
Figure 7A:
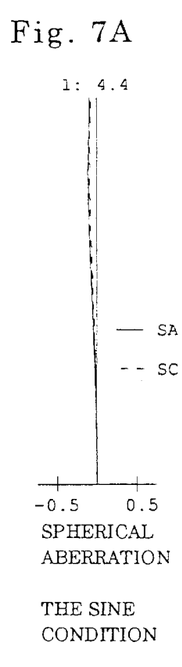
FIGS. 7A, 7B, 7C, 7D and 7E are aberration diagrams of the zoom lens system shown in FIG. 5 at an intermediate focal-length.
Figure 7B:
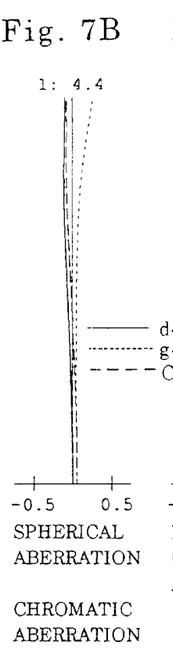
Figure 7C:
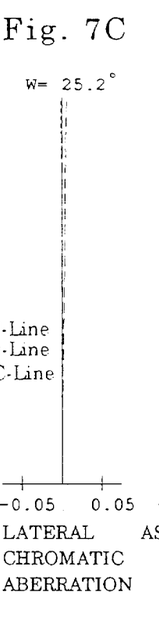
Figure 7D:
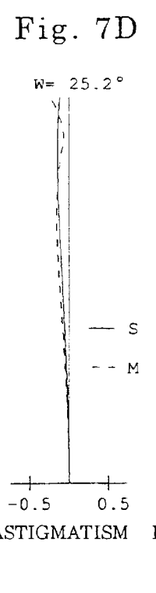
Figure 7E:
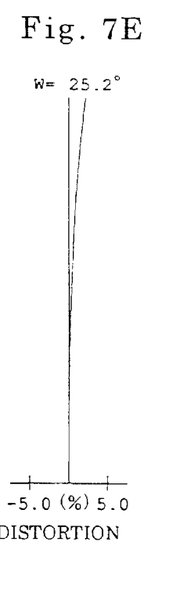
Figure 8A:
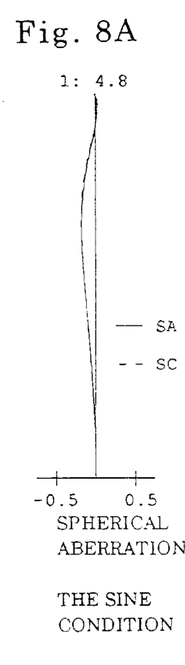
FIGS. 8A, 8B, 8C, 8D and 8E are aberration diagrams of the zoom lens system shown in FIG. 5 at the long focal-length extremity.
Figure 8B:
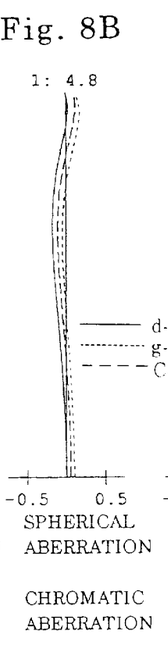
Figure 8C:
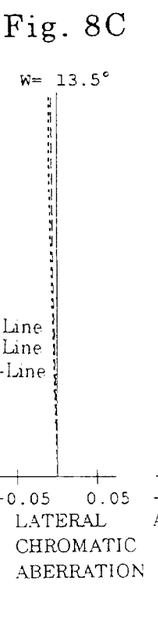
Figure 8D:
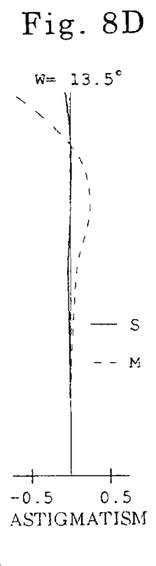
Figure 8E:
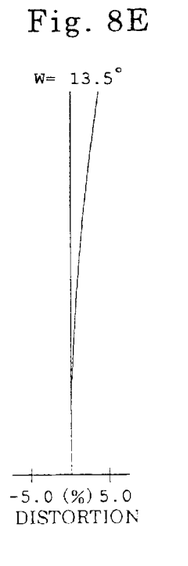

FIG. 5 is a lens arrangement of the second embodiment of a zoom lens system according to the present invention. FIGS. 6A through 6E, FIGS. 7A through 7E, and FIGS. 8A through 8E are aberration diagrams of the zoom lens system shown in FIG. 5 at the short focal-length extremity, an intermediate focal-length, and the long focal-length extremity, respectively. The numerical data thereof is shown in Table 2.

TABLE 2

$F_{NO} = 1:3.7–4.4–4.8$
$f = 24.89–45.00–86.80$ (zoom ratio:3.48)
$W = 42.1°–25.2°–13.50°$
$f_B = 38.50–55.11–70.30$

| Surface No. | R | D | $N_d$ | $\nu_d$ |
|---|---|---|---|---|
| 1 | 438.437 | 1.80 | 1.84666 | 23.8 |
| 2 | 76.877 | 5.76 | 1.77250 | 49.6 |
| 3 | 14760.212 | 0.10 | — | — |
| 4 | 47.988 | 4.81 | 1.77250 | 49.6 |
| 5 | 143.605 | 2.44–12.04–27.97 | — | — |
| 6 * | 213.449 | 0.30 | 1.52630 | 51.1 |
| 7 | 118.197 | 1.30 | 1.83481 | 42.7 |
| 8 | 14.508 | 5.46 | — | — |
| 9 | −44.170 | 4.30 | 1.51742 | 52.4 |
| 10 | −16.084 | 1.20 | 1.83481 | 42.7 |
| 11 | −307.254 | 0.11 | — | — |
| 12 | 51.461 | 4.23 | 1.84666 | 23.8 |
| 13 | −24.965 | 0.21 | — | — |
| 14 | −22.485 | 1.20 | 1.80400 | 46.6 |
| 15 | −414.046 | 14.79–6.41–1.00 | — | — |
| Diaphragm | — | 1.20 | — | — |
| 16 | 39.478 | 4.52 | 1.61800 | 63.4 |
| 17 | −47.232 | 0.10 | — | — |
| 18 | 21.826 | 4.40 | 1.48749 | 70.2 |
| 19 | −48203.003 | 2.87 | — | — |
| 20 | −36.734 | 1.20 | 1.84666 | 23.8 |
| 21 | 100.040 | 7.29–3.86–2.67 | — | — |
| 22 | 40.829 | 5.00 | 1.56883 | 56.3 |
| 23 | −23.614 | 0.10 | — | — |
| 24 * | −1500.000 | 2.00 | 1.72873 | 40.5 |
| 25 | 36.264 | — | — | — |

* designates the aspherical surface which is symmetrical with respect to the optical axis.

Aspherical surface data (the aspherical surface coefficients not indicated are zero (0.00)):
No.6:k=−1.0, A4=0.1860×10$^{-4}$, A6=−0.3648×10$^{-7}$, A8= 0.9952×10$^{-10}$
No.24:k=−1.0, A4=−0.4012×10$^{-4}$, A6=−0.5640×10$^{-7}$, A8=− 0.3565×10$^{-9}$

[Third Embodiment]

Figure 9:
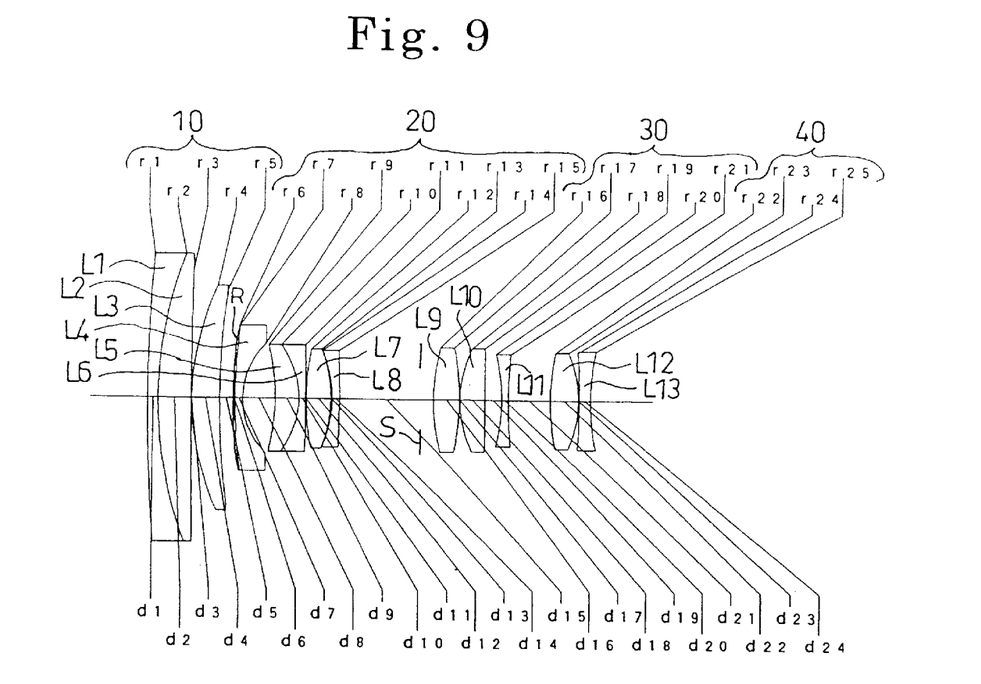
FIG. 9 is a lens arrangement of the third embodiment of a zoom lens system according to the present invention.
Figure 10A:
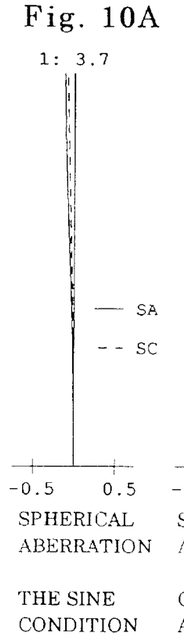
FIGS. 10A, 10B, 10C, 10D and 10E are aberration diagrams of the zoom lens system shown in FIG. 9 at the short focal-length extremity.
Figures 10B, 10C:
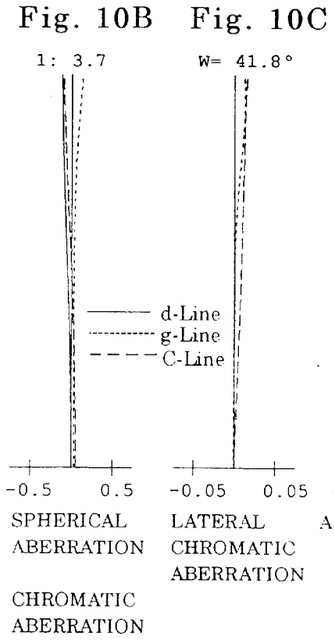
Figure 10D:
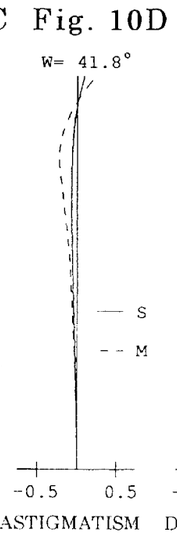
Figure 10E:
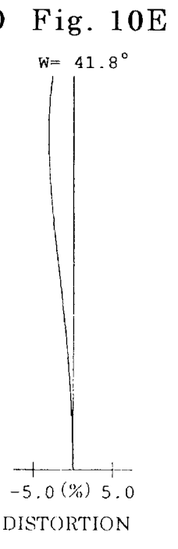
Figure 11A:
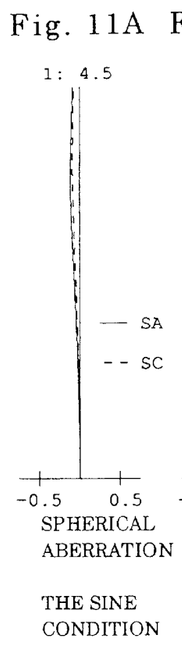
FIGS. 11A, 11B, 11C, 11D and 11E are aberration diagrams of the zoom lens system shown in FIG. 9 at an intermediate focal-length.
Figures 11B, 11C:
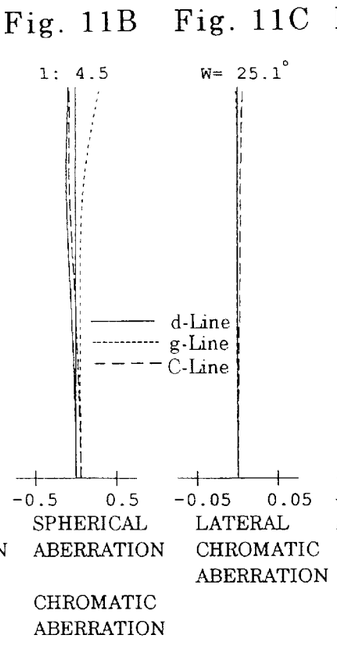
Figure 11D:
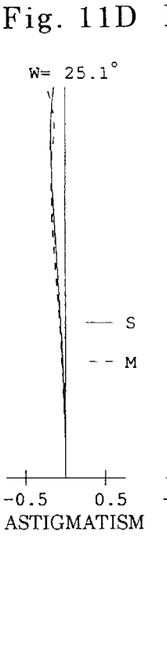
Figure 11E:
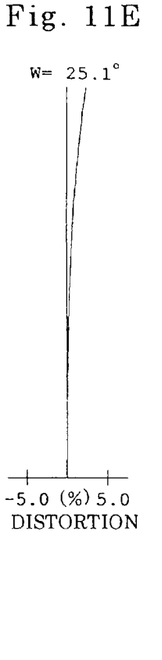
Figure 12A:
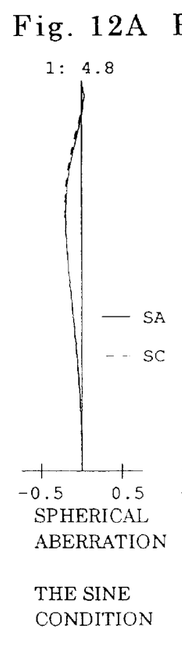
FIGS. 12A, 12B, 12C, 12D and 12E are aberration diagrams of the zoom lens system shown in FIG. 9 at the long focal-length extremity.
Figures 12B, 12C:
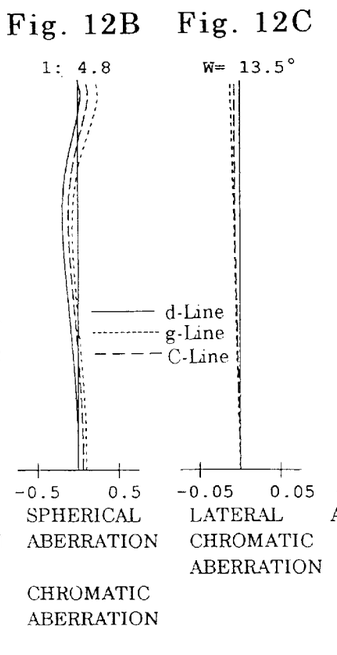
Figure 12D:
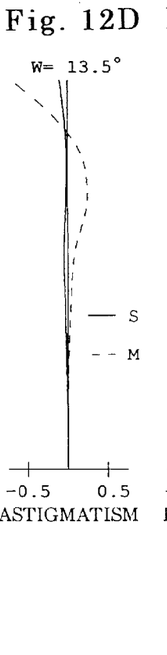
Figure 12E:
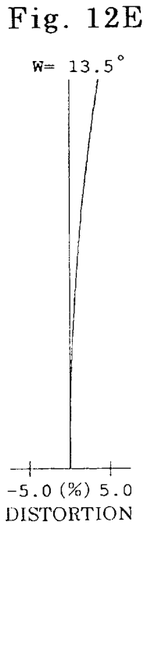

FIG. 9 is a lens arrangement of the third embodiment of a zoom lens system according to the present invention. FIGS. 10A through 10E, FIGS. 11A through 11E, and FIGS. 12A through 12E are aberration diagrams of the zoom lens system shown in FIG. 9 at the short focal-length extremity, an intermediate focal-length, and the long focal-length extremity, respectively. The numerical data thereof is shown in Table 3.

TABLE 3

$F_{NO} = 1:3.7–4.5–4.8$
$f = 24.89–45.01–86.80$ (zoom ratio:3.48)
$W = 41.8°–25.1°–13.5°$
$f_B = 38.50–55.25–70.50$

| Surface No. | R | D | Nd | $\nu_d$ |
|---|---|---|---|---|
| 1 | 304.533 | 1.80 | 1.84666 | 23.8 |
| 2 | 71.947 | 5.74 | 1.77250 | 49.6 |
| 3 | 978.953 | 0.10 | — | — |
| 4 | 47.885 | 4.81 | 1.77250 | 49.6 |
| 5 | 142.776 | 2.38–11.98–27.82 | — | — |
| 6 * | 189.012 | 0.30 | 1.52630 | 51.1 |
| 7 | 109.795 | 1.30 | 1.83481 | 42.7 |
| 8 | 14.272 | 5.67 | — | — |
| 9 | −40.759 | 4.11 | 1.51742 | 52.4 |
| 10 | −16.569 | 1.20 | 1.83481 | 42.7 |
| 11 | −339.872 | 0.11 | — | — |
| 12 | 51.771 | 4.23 | 1.84666 | 23.8 |

TABLE 3-continued

| | | | | |
|---|---|---|---|---|
| 13 | −25.381 | 0.24 | — | — |
| 14 | −22.540 | 1.20 | 1.80400 | 46.6 |
| 15 | −255.980 | 14.88–6.44–1.00 | — | — |
| Diaphragm | — | 1.20 | — | — |
| 16 | 38.442 | 4.52 | 1.61800 | 63.4 |
| 17 | −48.558 | 0.10 | — | — |
| 18 | 21.660 | 4.40 | 1.48749 | 70.2 |
| 19 | −609.714 | 2.91 | — | — |
| 20 | −36.364 | 1.20 | 1.84666 | 23.8 |
| 21 | 93.382 | 7.30–3.84–2.65 | — | — |
| 22 | 43.247 | 5.00 | 1.51633 | 64.1 |
| 23 | −22.164 | 0.10 | — | — |
| 24 * | −1488.534 | 2.00 | 1.74330 | 49.3 |
| 25 | 42.337 | — | — | — |

* designates the aspherical surface which is symmetrical with respect to the optical axis.

Aspherical surface data (the aspherical surface coefficients not indicated are zero (0.00)):
No.6:k=−1.0, A4=0.1888×10$^{-4}$, A6=−0.3622×10$^{-7}$, A8= 0.9206×10$^{-10}$
No.24:k=−1.0, A4=0.3883×10$^{-4}$, A6=−0.5756×10$^{-7}$, A8=− 0.4019×10$^{-9}$

[Fourth Embodiment]

Figure 13:
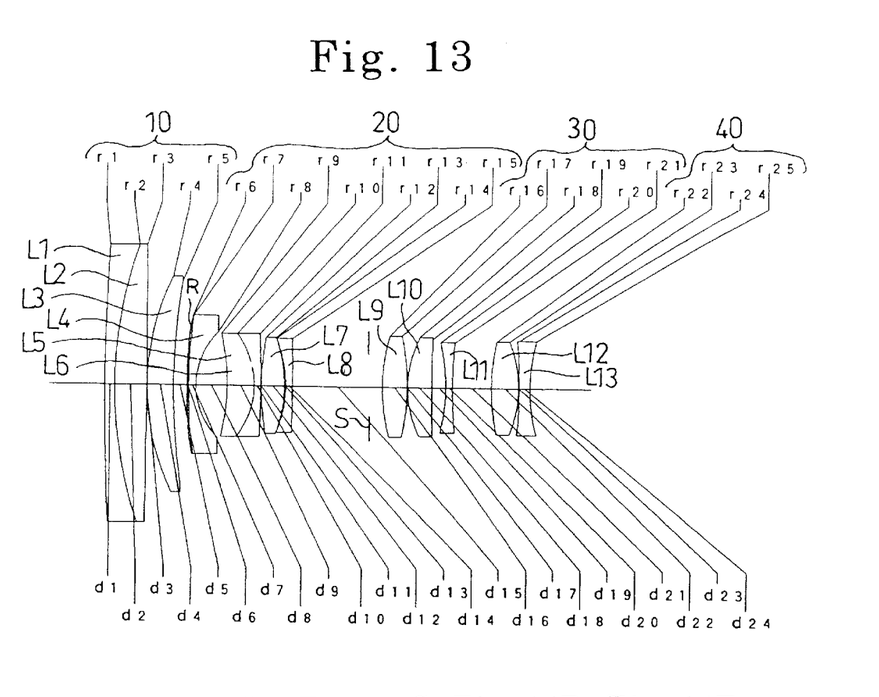
FIG. 13 is a lens arrangement of the fourth embodiment of a zoom lens system according to the present invention.
Figures 14A, 14B, 14C:
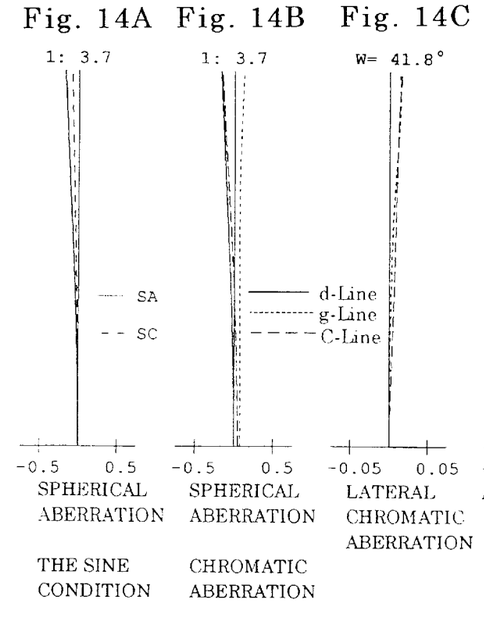
FIGS. 14A, 14B, 14C, 14D and 14E are aberration diagrams of the zoom lens system shown in FIG. 13 at the short focal-length extremity.
Figure 14D:
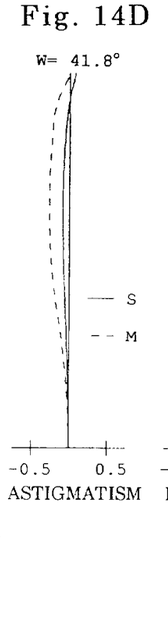
Figure 14E:
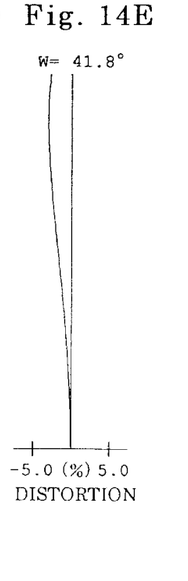
Figure 15A:
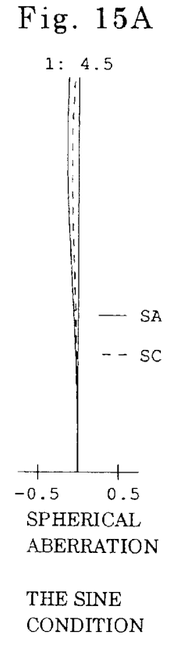
FIGS. 15A, 15B, 15C, 15D and 15E are aberration diagrams of the zoom lens system shown in FIG. 13 at an intermediate focal-length.
Figures 15B, 15C, 15D:
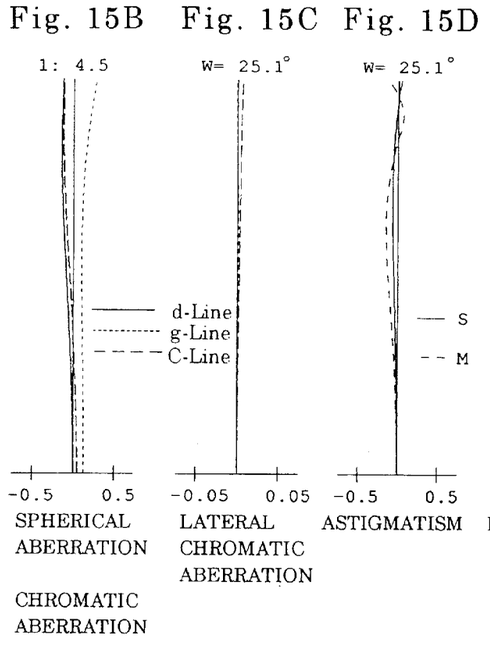
Figure 15E:
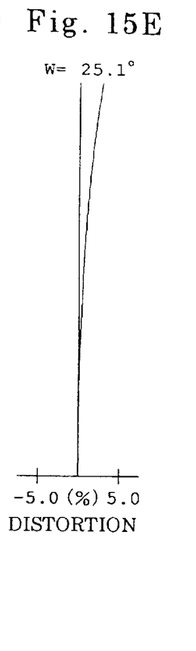
Figure 16A:
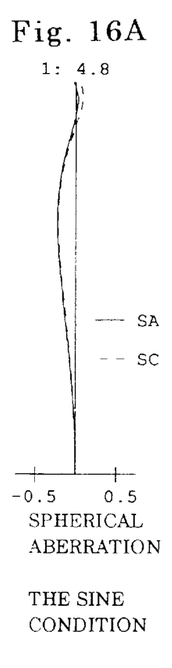
FIGS. 16A, 16B, 16C, 16D and 16E are aberration diagrams of the zoom lens system shown in FIG. 13 at the long focal-length extremity.
Figures 16B, 16C:
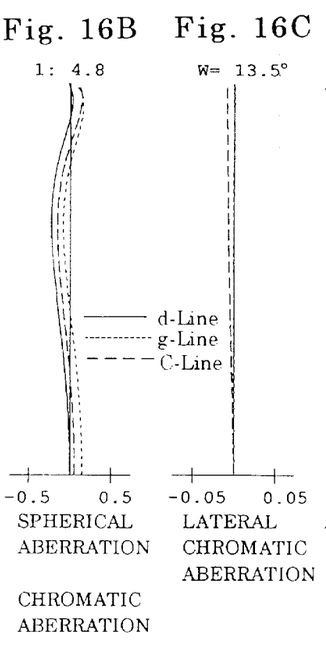
Figure 16D:
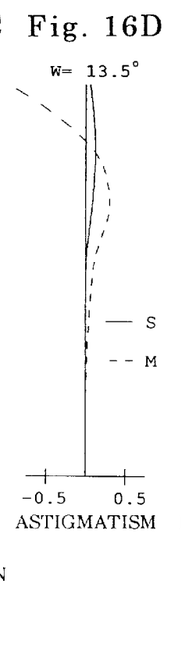
Figure 16E:
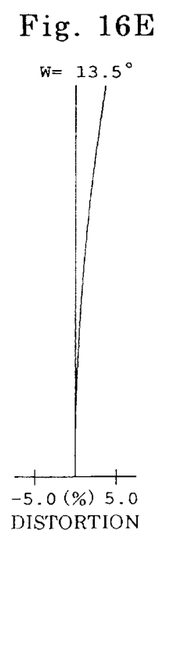

FIG. 13 is a lens arrangement of the fourth embodiment of a zoom lens system according to the present invention. FIGS. 14A through 14E, FIGS. 15A through 15E, and FIGS. 16A through 16E are aberration diagrams of the zoom lens system shown in FIG. 13 at the short focal-length extremity, an intermediate focal-length, and the long focal-length extremity, respectively. The numerical data thereof is shown in Table 4.

TABLE 4

$F_{NO} = 1:3.7–4.5–4.8$
$f = 24.91–45.02–86.67$ (zoom ratio:3.48)
$W = 41.8°–25.1°–13.5°$
$f_B = 38.49–55.08–70.50$

| Surface No. | R | D | Nd | $\nu_d$ |
|---|---|---|---|---|
| 1 | 445.920 | 1.80 | 1.84666 | 23.8 |
| 2 | 81.224 | 5.75 | 1.77250 | 49.6 |
| 3 | −2385.674 | 0.10 | — | — |
| 4 | 47.974 | 4.73 | 1.77250 | 49.6 |
| 5 | 128.252 | 2.45–12.20–28.21 | — | — |
| 6 * | 159.750 | 0.30 | 1.52630 | 51.1 |
| 7 | 102.000 | 1.30 | 1.83481 | 42.7 |
| 8 | 14.372 | 5.73 | — | — |
| 9 | −40.949 | 4.85 | 1.51742 | 52.4 |
| 10 | −16.570 | 1.20 | 1.83481 | 42.7 |
| 11 | −234.000 | 0.11 | — | — |
| 12 | 52.969 | 4.23 | 1.84666 | 23.8 |
| 13 | −26.250 | 0.23 | — | — |
| 14 | −23.440 | 1.20 | 1.80400 | 46.6 |
| 15 | −354.600 | 15.21–6.58–1.00 | — | — |
| Diaphragm | — | 1.20 | — | — |
| 16 | 37.780 | 4.52 | 1.61800 | 63.4 |
| 17 | −46.694 | 0.10 | — | — |
| 18 | 21.730 | 4.40 | 1.48749 | 70.2 |
| 19 | 600.000 | 2.50 | — | — |
| 20 | −38.754 | 1.20 | 1.84666 | 23.8 |
| 21 | 90.467 | 7.14–4.02–2.79 | — | — |
| 22 | 42.227 | 5.00 | 1.60311 | 60.7 |
| 23 | −24.140 | 0.10 | — | — |
| 24 * | −376.147 | 2.00 | 1.75041 | 45.4 |
| 25 | 35.000 | — | — | — |

* designates the aspherical surface which is symmetrical with respect to the optical axis.

Aspherical surface data (the aspherical surface coefficients not indicated are zero (0.00)):
No.6: k=−1.0, A4=0.1909×10$^{-4}$, A6=−0.4356×10$^{-7}$, A8= 0.1000×10$^{-9}$ No.24: $k=-1.0, A4=-0.4099\times10^{-4}, A6=-0.5540\times10^{-7}, A8=-0.3626\times10^{-9}$

[Fifth Embodiment]

Figure 17:
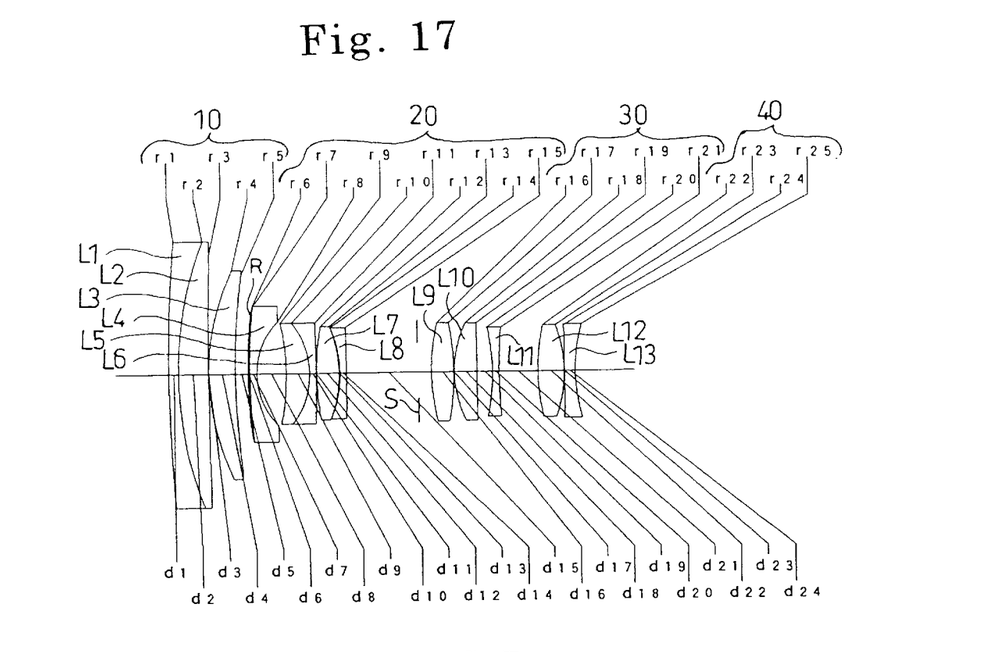
FIG. 17 is a lens arrangement of the fifth embodiment of a zoom lens system according to the present invention.
Figure 18A:
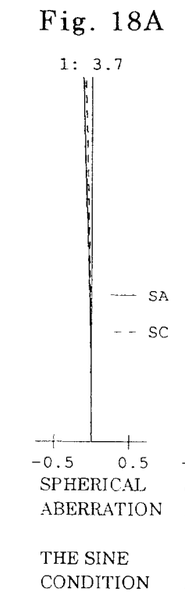
FIGS. 18A, 18B, 18C, 18D and 18E are aberration diagrams of the zoom lens system shown in FIG. 17 at the short focal-length extremity.
Figures 18B, 18C, 18D, 18E:
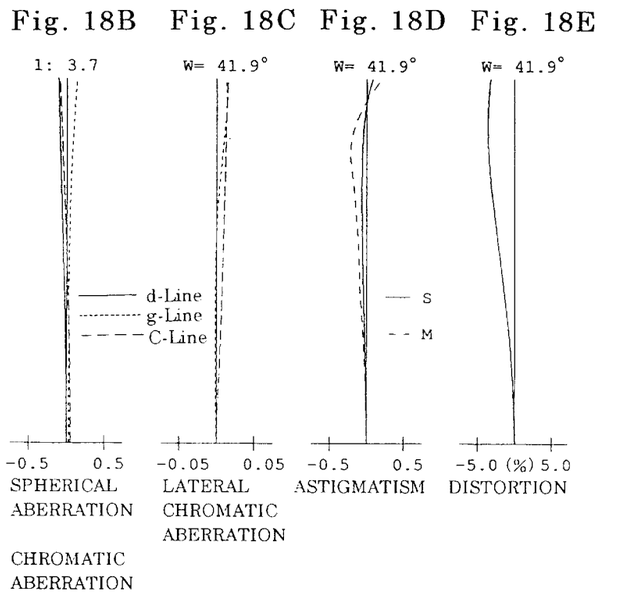
Figure 19A:
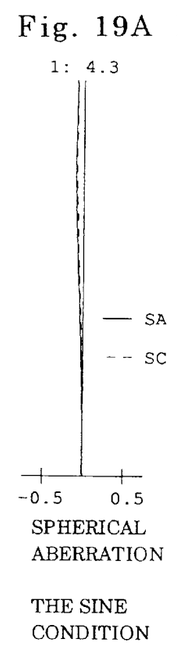
FIGS. 19A, 19B, 19C, 19D and 19E are aberration diagrams of the zoom lens system shown in FIG. 17 at an intermediate focal-length.
Figures 19B, 19C:
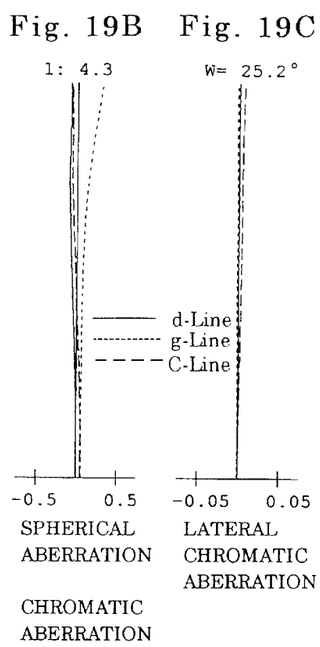
Figures 19D, 19E:
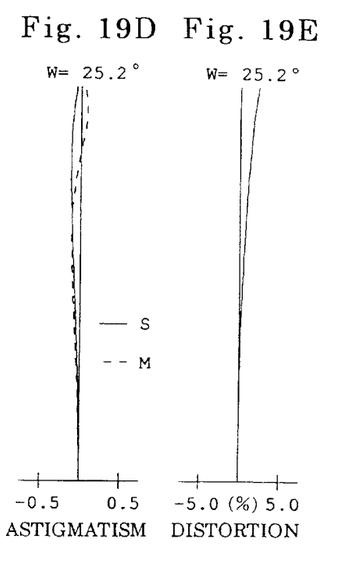
Figure 20A:
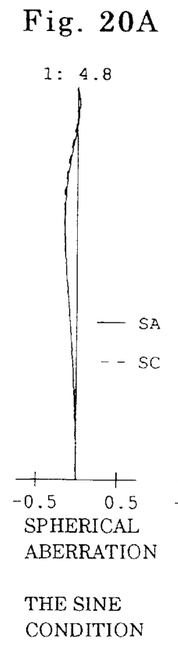
FIGS. 20A, 20B, 20C, 20D and 20E are aberration diagrams of the zoom lens system shown in FIG. 17 at the long focal-length extremity.
Figures 20B, 20C:
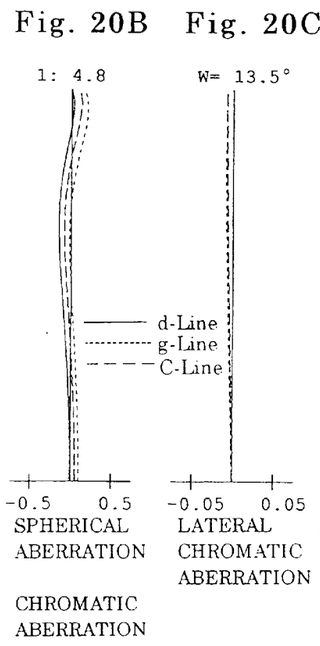
Figures 20D, 20E:
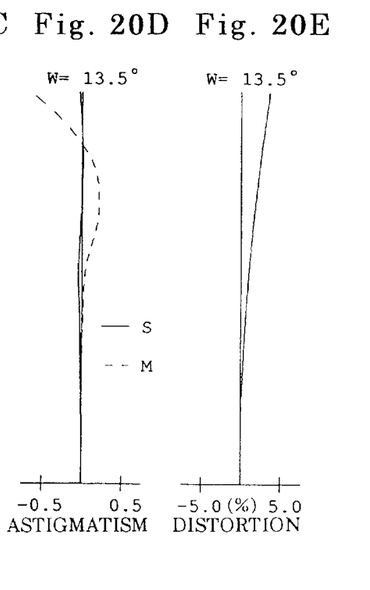
Figure 21:
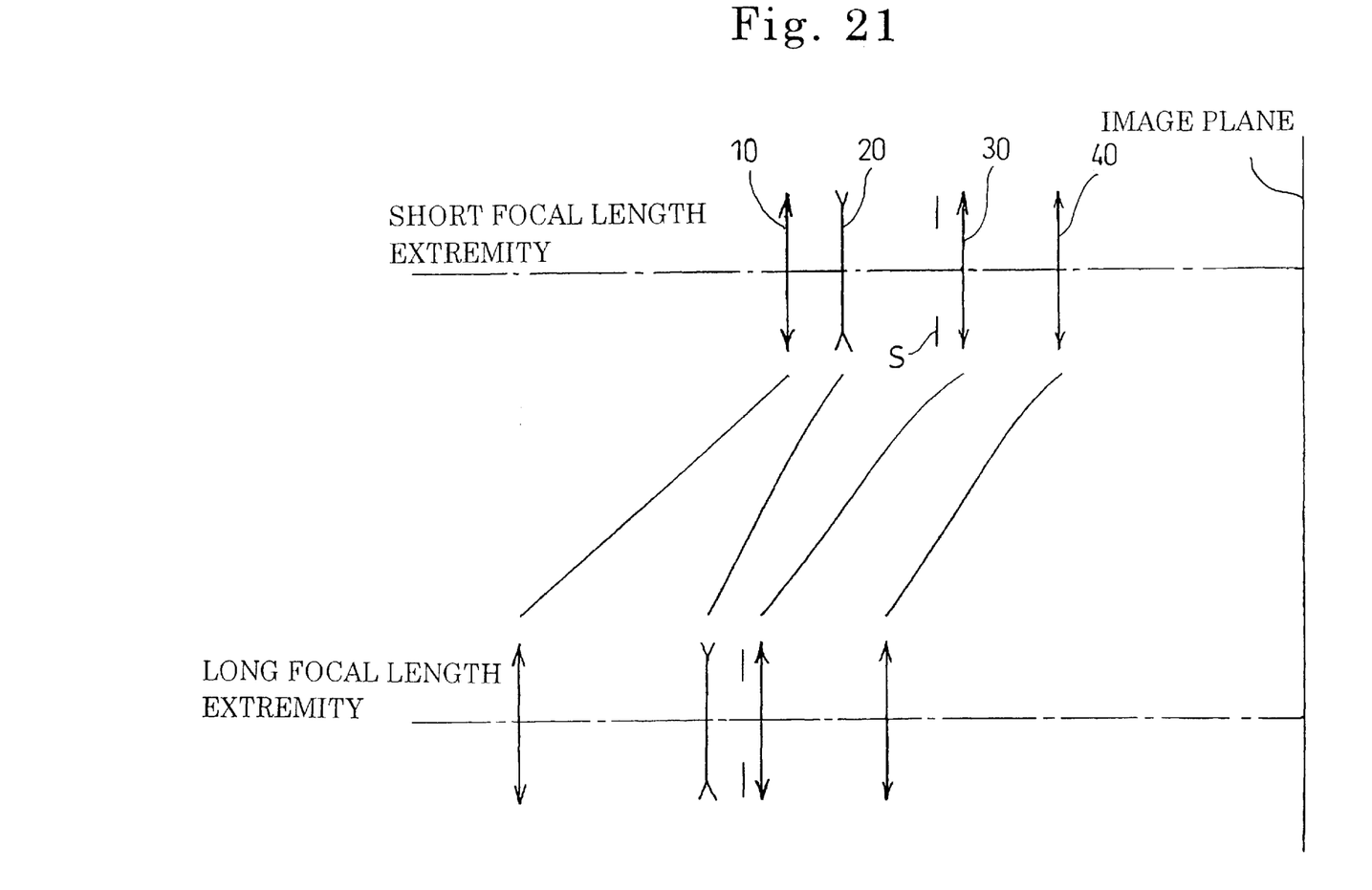
FIG. 21 is a diagram of the lens-group traveling paths of the zoom lens system according to the present invention.

FIG. 17 is a lens arrangement of the fifth embodiment of a zoom lens system according to the present invention. FIGS. 18A through 18E, FIGS. 19A through 19E, and FIGS. 20A through 20E are aberration diagrams of the zoom lens system shown in FIG. 17 at the short focal-length extremity, an intermediate focal-length, and the long focal-length extremity, respectively. The numerical data thereof is shown in Table 5.

TABLE 5

$F_{NO} = 1:3.7–4.3–4.8$
$f = 24.89–45.00–86.80$ (zoom ratio:3.48)
$W = 41.9°–25.2°–13.5°$
$f_B = 38.50–55.07–70.29$

| Surface No. | R | D | Nd | $v_d$ |
|---|---|---|---|---|
| 1 | 293.773 | 1.80 | 1.84666 | 23.8 |
| 2 | 71.519 | 5.63 | 1.77250 | 49.6 |
| 3 | 757.805 | 0.10 | — | — |
| 4 | 47.912 | 4.85 | 1.77250 | 49.6 |
| 5 | 146.252 | 2.41–11.98–27.82 | — | — |
| 6 * | 224.463 | 0.30 | 1.52630 | 51.1 |
| 7 | 116.495 | 1.30 | 1.83481 | 42.7 |
| 8 | 14.477 | 5.51 | — | — |
| 9 | -44.915 | 4.38 | 1.51742 | 52.4 |
| 10 | -15.807 | 1.20 | 1.83481 | 42.7 |
| 11 | -307.419 | 0.11 | — | — |
| 12 | 52.592 | 4.23 | 1.84666 | 23.8 |
| 13 | -24.927 | 0.22 | — | — |
| 14 | -22.427 | 1.20 | 1.80400 | 46.6 |
| 15 | -327.320 | 14.77–6.41–1.00 | — | — |
| Diaphragm | — | 1.20 | — | — |
| 16 | 41.604 | 4.17 | 1.61800 | 63.4 |
| 17 | -47.489 | 0.10 | — | — |
| 18 | 21.796 | 4.30 | 1.48749 | 70.2 |
| 19 | -883.536 | 2.88 | — | — |
| 20 | -37.521 | 1.20 | 1.84666 | 23.8 |
| 21 | 101.004 | 7.37–3.97–2.74 | — | — |
| 22 | 39.208 | 5.00 | 1.56883 | 56.3 |
| 23 | -24.410 | 0.10 | — | — |
| 24 * | 512.605 | 2.00 | 1.72750 | 40.3 |
| 25 | 32.894 | — | — | — |

\* designates the aspherical surface which is symmetrical with respect to the optical axis.

Aspherical surface data (the aspherical surface coefficients not indicated are zero (0.00)):

No.6: $k=-1.0, A4=0.1971\times10^{-4}, A6=-0.3839\times10^{-7}, A8=0.1078\times10^{-9}$.

No.24: $k=-1.0, A4=-0.3960\times10^{-4}, A6=-0.5592\times10^{-7}, A8=-0.3344\times10^{-9}$.

Table 6 shows the numerical data for each condition for each embodiment.

TABLE 6

|  | Condition (1) | Condition (2) | Condition (3) |
|---|---|---|---|
| Embodiment 1 | -1.193 | 0.118 | 1.66910 |
| Embodiment 2 | -1.193 | 0.115 | 1.72873 |
| Embodiment 3 | -1.192 | 0.117 | 1.74330 |
| Embodiment 4 | -1.175 | 0.100 | 1.750A1 |
| Embodiment 5 | -1.194 | 0.116 | 1.72750 |

Each embodiment satisfies conditions (1), (2) and (3), and aberrations are adequately corrected.

According to a four-lens-group zoom lens system according to the present invention, a half view-angle of about 42° at the wide-angle extremity and a zoom ratio of 3.5 can be provided.

What is claimed is:

1. A zoom lens system comprising a positive first lens group, a negative second lens group, a positive third lens group, and a positive fourth lens group, in this order from the object, wherein all of said lens groups move toward the object upon zooming from the short focal length extremity to the long focal length extremity;

wherein said positive third lens group includes at least a positive lens element and a negative lens element, in this order from the object;

wherein said positive fourth lens group includes at least one negative lens element; and wherein when the object distance changes from infinity to a finite object distance, focusing is performed by moving said second lens group toward the object, and said zoom lens system satisfies the following conditions:

$-1.23 < m_{3-4W} < -1.0$ $0.02 < d_{19}/fw < 0.30$ $1.6 < n_{L13} < 1.76$ wherein:

$m_{3-4W}$ designates the resultant lateral magnification of said third and fourth lens groups which are considered to be one lens group at the short focal length extremity;

$d_{19}$ designates the distance between said positive lens element and said negative lens element in the third lens group;

fw designates the focal length of the entire lens system at the short focal length extremity; and $n_{L13}$ designates the refractive index of said negative lens element closest to the image in the fourth lens group.

2. The zoom lens according to claim 1, wherein said positive first lens group comprises a cemented sub lens group having a negative lens element and a positive lens element, and a positive meniscus lens element having a convex surface on the object side, in this order from the object;

said negative second lens group comprises a negative meniscus lens element having a convex surface on the object side, a cemented sub lens group having a positive lens element and a negative lens element, a positive lens element, and a negative lens element having a strongly powered concave surface on the object side, in this order from the object; and said positive third lens group comprises a bi-convex positive lens element, a positive lens element having a strongly powered convex surface on the object side, and a negative lens element, in this order from the object; and said positive fourth lens group comprises a positive lens element, and a negative lens element having a strongly powered concave surface on the image side.

3. The zoom lens according to claim 1, wherein said zoom lens system satisfies the following condition:

$0.04 < d_{19}/fw < 0.30$.

4. The zoom lens according to claim 2, wherein said zoom lens system satisfies the following condition:

$0.04 < d_{19}/fw < 0.30$.

\* \* \* \* \*